(12) United States Patent
Sunohara

(10) Patent No.: US 6,663,179 B2
(45) Date of Patent: Dec. 16, 2003

(54) AUTOMOBILE SEAT

(75) Inventor: Hikaru Sunohara, Tokyo-To (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 7 days.

(21) Appl. No.: 09/950,925

(22) Filed: Sep. 13, 2001

(65) Prior Publication Data

US 2002/0033623 A1 Mar. 21, 2002

(30) Foreign Application Priority Data

Sep. 13, 2000 (JP) ........................................ 2000-278080

(51) Int. Cl.[7] ................................................. B60N 2/02
(52) U.S. Cl. ........................ 297/378; 297/331; 297/341; 296/69
(58) Field of Search ................................. 297/331, 340, 297/378.1, 341; 296/69, 65.16, 65.1, 66

(56) References Cited

U.S. PATENT DOCUMENTS

| | | | |
|---|---|---|---|
| 4,191,417 A | * 3/1980 | Ferrara | 296/65 R |
| 5,741,046 A | * 4/1998 | Leuchtmann et al. | 297/378.13 |
| 5,795,023 A | * 8/1998 | Kayumi | 297/331 |
| 5,913,570 A | * 6/1999 | Yoshida et al. | 297/378.14 |
| 6,000,751 A | * 12/1999 | Kato et al. | 297/15 |
| 6,089,641 A | * 7/2000 | Mattarella et al. | 296/64 |
| 6,193,317 B1 | * 2/2001 | Mitschelen et al. | 297/378.1 |
| 6,375,255 B1 | * 4/2002 | Maruta et al. | 297/15 |
| 6,386,629 B1 | * 5/2002 | Severinski et al. | 297/188.1 |

* cited by examiner

Primary Examiner—Rodney B. White
Assistant Examiner—Stephanie Harris
(74) Attorney, Agent, or Firm—Smith, Gambrell & Russell, LLP

(57) ABSTRACT

A backseat (10) has a seat cushion (11) and a seat back (14). The seat cushion (11) is divided into a movable block (12) and a stationary block (13). When turning forward the seat back (14) in the horizontal position to expand a luggage compartment (2), the stationary block (13) does not obstruct turning the seat back (14), and it is left unmoved and the movable block (12) normally set at a first position is shifted to a second position in front of and on a level below that of the first position. The movable block (12) does not obstruct the sliding and reclining operations of a front seat disposed in front of the backseat.

15 Claims, 6 Drawing Sheets

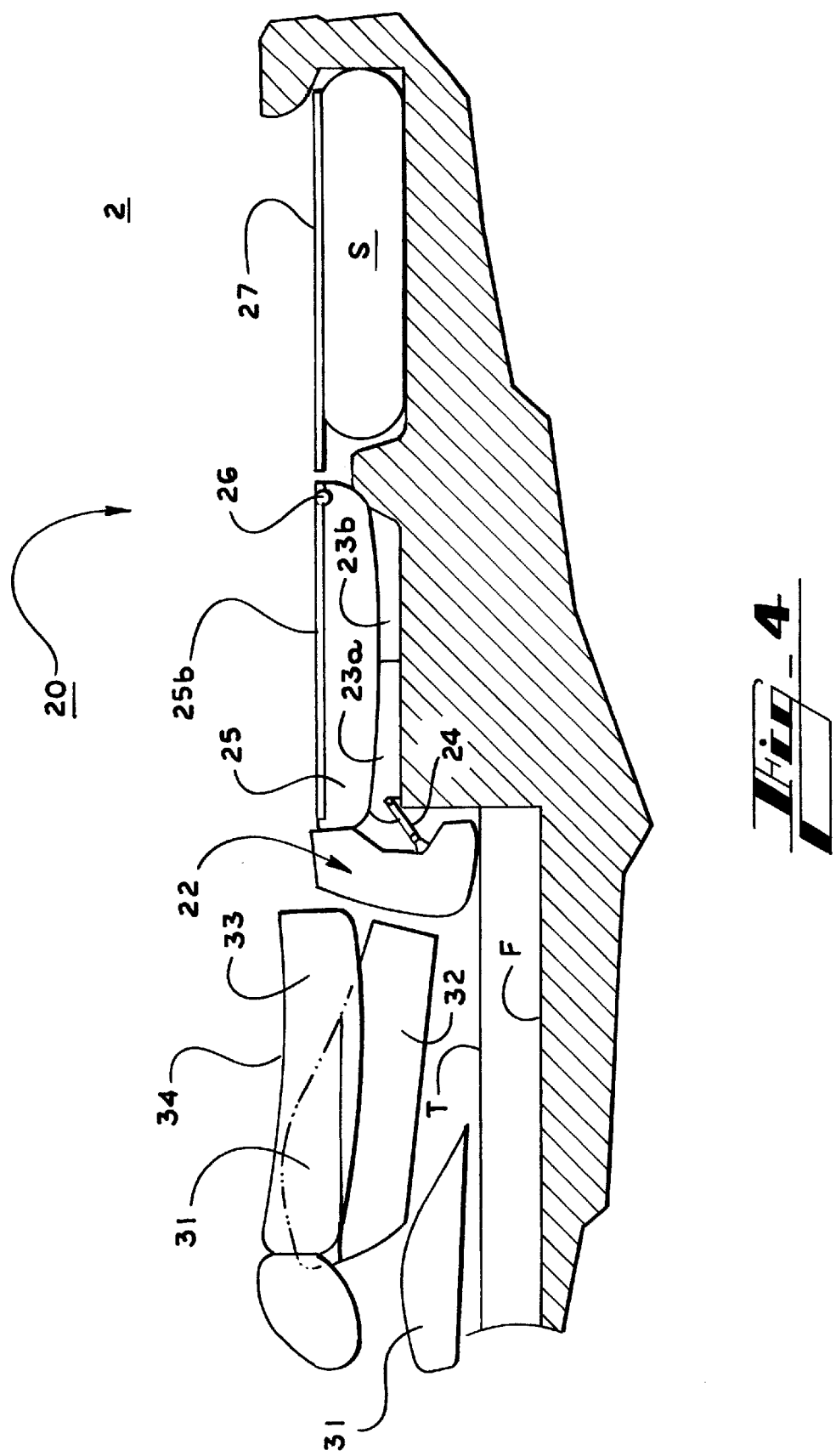

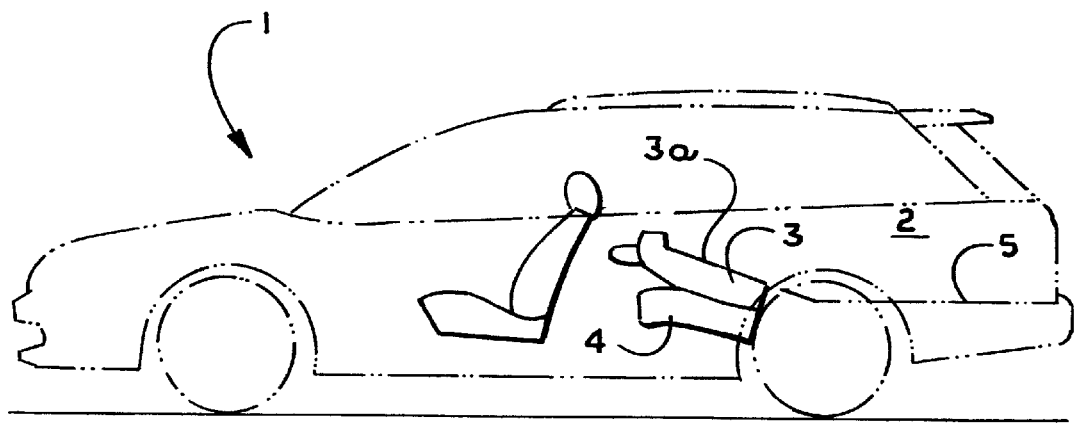
Fig_5 PRIOR ART
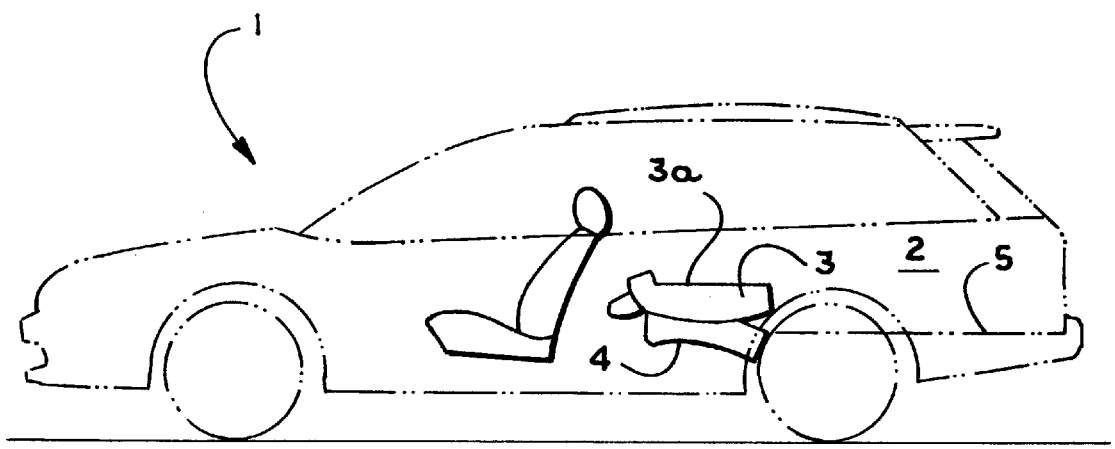
Fig_6 PRIOR ART

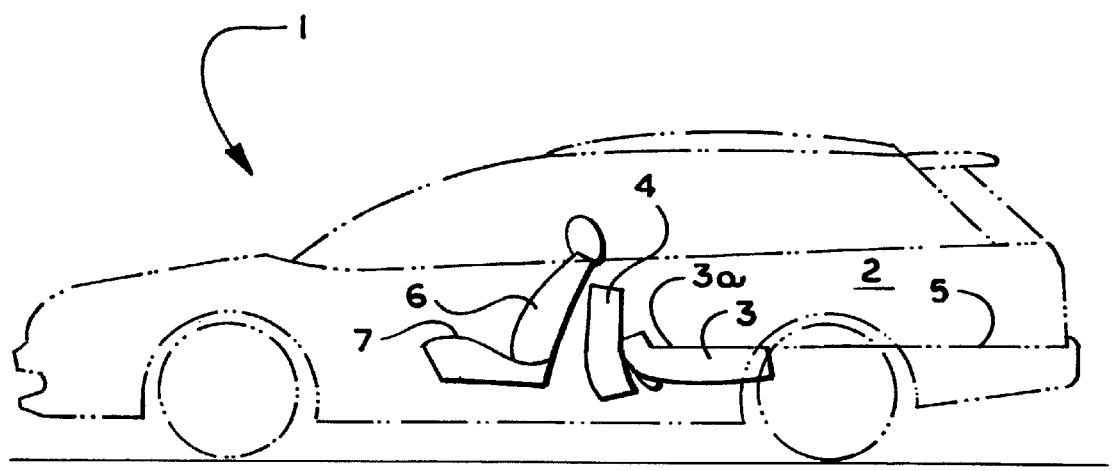
Fig_7 PRIOR ART

AUTOMOBILE SEAT

BACKGROUND OF THE INVENTION

1. Field of the Invention

The present invention relates to an automobile seat and, more specifically, to an improved automobile seat having a seat back capable of being inclined forward and set in a horizontal position to form a low luggage compartment floor without obstructing the sliding and reclining operations of the seat.

2. Description of the Related Art

Referring to FIG. 5, a station wagon 1 is provided with a backseat having a seat cushion 4, and a seat back 3 that can be inclined forward. Generally, the thickness of the seat cushion 4 is increased toward the front in order that the seat cushion 4 is able to support a passenger seated thereon firmly and the passenger is able to sit comfortably thereon. Therefore, when the seat back 3 is inclined forward over the seat cushion 4, the back surface 3a of the seat back 3 slopes up toward the front. Although the sloping back surface 3a of the seat back 3 is continuous with the surface of the floor board 5 of a luggage compartment 2, the same is unable to form a wide flat surface in the luggage compartment 2 together with the surface of the floor board 5.

Another conventional seat shown in FIG. 6 has a seat cushion 4, and a seat back 3 connected to the seat cushion 4 by an improved hinge mechanism and capable of being inclined forward so that its back surface 3a is set in the horizontal position. Although the back surface 3a is horizontal, there is an undesirable big difference in level between the back surface 3a of the seat back 3 and the surface of the floor board 5 of a luggage compartment 2.

A third conventional seat shown in FIG. 7 has a seat cushion 4 and a seat back 3. A front part of the seat cushion 4 is supported pivotally. The seat cushion 4 can be turned and set in a vertical position, and the seat back 3 can be inclined forward and set on the floor such that the back surface 3a of the seat back 3 is flush with the surface of the floor board 5 of a luggage compartment 2. Thus, a flat, wide, low-level surface is formed in the luggage compartment 2. However, since the seat cushion 4 of the backseat is set in a vertical position behind the seat back 6 of a front seat disposed in front of the backseat, the front seat cannot be slid rearward and cannot be reclined.

SUMMARY OF THE INVENTION

Accordingly, it is an object of the present invention to provide a an improved automobile seat having a seat back capable of being inclined forward and set in the horizontal position to form a low luggage compartment floor without obstructing the sliding and reclining operations of a seat disposed in front thereof.

According to a first aspect of the present invention, an automobile seat including a seat cushion, and a seat back capable of being inclined forward so that its back surface is flush with the surface of the floor board of a luggage compartment extending behind the seat cushion, wherein the seat cushion is divided into a stationary block and a movable block, the stationary block underlies the seat back when the seat back is inclined forward and set in the horizontal position, and the movable block can be moved between a first position where the movable block forms the seat cushion together with the stationary block and a second position in front of and on a level below that of the first position, where the movable block does not interfere with the seat back when the seat back is inclined forward and set in the horizontal position.

When the seat back of the automobile seat of the present invention is inclined forward and set in the horizontal position to enlarge a luggage compartment, the stationary block that does not interfere with the seat back is kept in place, while the movable block that interferes with the seat back when kept at the first position is shifted to the second position. Since only the movable part, i.e., a small part of the seat cushion, is shifted forward and downward, the movable block placed at the second position does not obstruct the sliding and reclining operations of the seat in front of the automobile seat of the present invention.

The movable block of the seat cushion may be a front block, i.e., a thigh support block for supporting the thighs of a passenger seated on the seat cushion, of the seat cushion, formed in a relatively big thickness in order that the seat cushion is able to support a passenger seated thereon firmly and the passenger is able to sit comfortably thereon, and the stationary block may be a rear block, i.e., a buttock support block for supporting the buttocks of the passenger, of the seat cushion, formed in a relatively small thickness.

The movable block may be an upper front part of a thigh support block of the seat cushion, and the stationary block may be the rest of the cushion seat.

The seat back may be inclined forward such that the back surface thereof is horizontal and a back part of the seat back may be formed of the same hardboard and the same covering material as those forming the floor of the luggage compartment.

The automobile seat may further include a support mechanism for supporting the movable block so as to be moved between the first and the second position. The support mechanism may be a hinge mechanism capable of supporting the movable block so as to be turnable in a vertical plane or a linkage capable of supporting the movable block so as to be simultaneously turnable and longitudinally movable in a vertical plane.

The stationary block may be divided into upper and lower parts and, when turning the seat back forward and setting the same in the horizontal position, the movable block may be shifted from the first position to the second position, and the upper part of the stationary block may be shifted to the first position.

When the upper part of the stationary block is shifted to the first position from which the front block has been shifted to the second position, the thickness of the part of the seat cushion underlying the seat back set in the horizontal position is reduced, so that the back surface of the seat back set in the horizontal position can be extended on a low level, and hence the surface of the floor board of the luggage compartment can be formed on a low level.

The seat back of a second seat disposed in front of the automobile seat may be capable of being inclined forward such that the back surface of the same is flush with the back surface of the seat back of the automobile seat, set in the horizontal position.

When the seat back of the automobile seat and that of the second seat are inclined forward and set in the horizontal position, the surface of the floor board of the luggage compartment extending behind the automobile seat can be expanded over the back surface of the seat back of the automobile seat and the back surface of the seat back of the second seat.

The automobile seat of the present invention and the seat disposed in front of the automobile seat of the present invention may be identical in the structure.

BRIEF DESCRIPTION OF THE DRAWINGS

The above and other objects, features and advantages of the present invention will become understood from the following description taken in connection with the accompanying drawings, in which:

FIG. 4 is a schematic side elevation of the automobile seat in the second embodiment in a state where the seat back is set in the horizontal position;

FIG. 5 is the typical side elevation of a conventional automobile seat;

FIG. 6 is the typical side elevation of another conventional automobile seat; and FIG. 7 is a typical side elevation of a third conventional automobile seat.

DESCRIPTION OF THE PREFERRED EMBODIMENTS

Preferred embodiments of the present invention will be described hereinafter with reference to the accompanying drawings, in which the terms "longitudinal", "lateral" and "vertical" are used to indicate positional and directional qualities of things, motions and such with respect to the longitudinal axis, width and height of a relevant automobile.

First Embodiment

Figure 1:
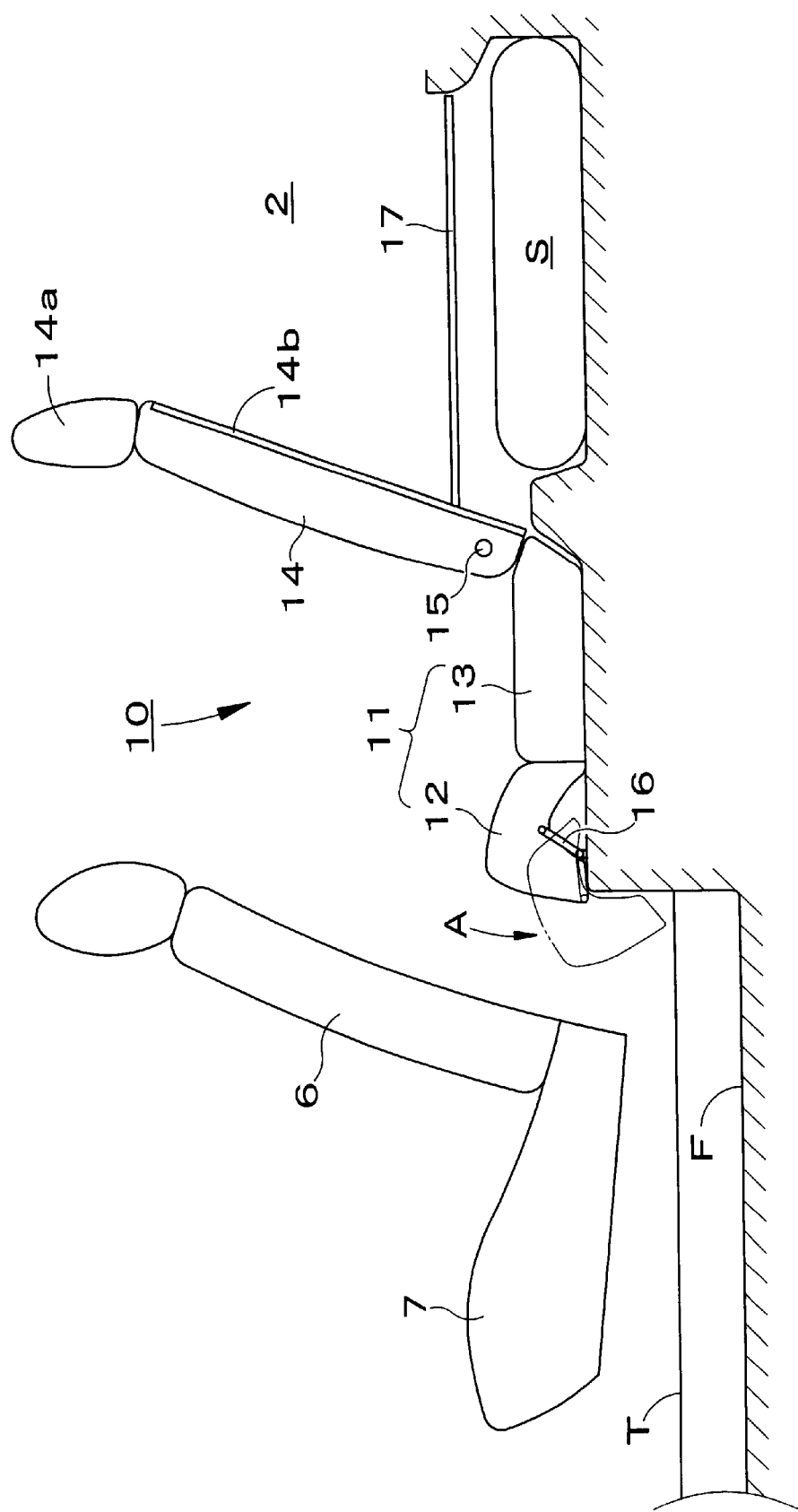
FIG. 1 is a schematic side elevation of an automobile seat in a first embodiment according to the present invention in a state where a seat back is in an upright position.
Figure 2:
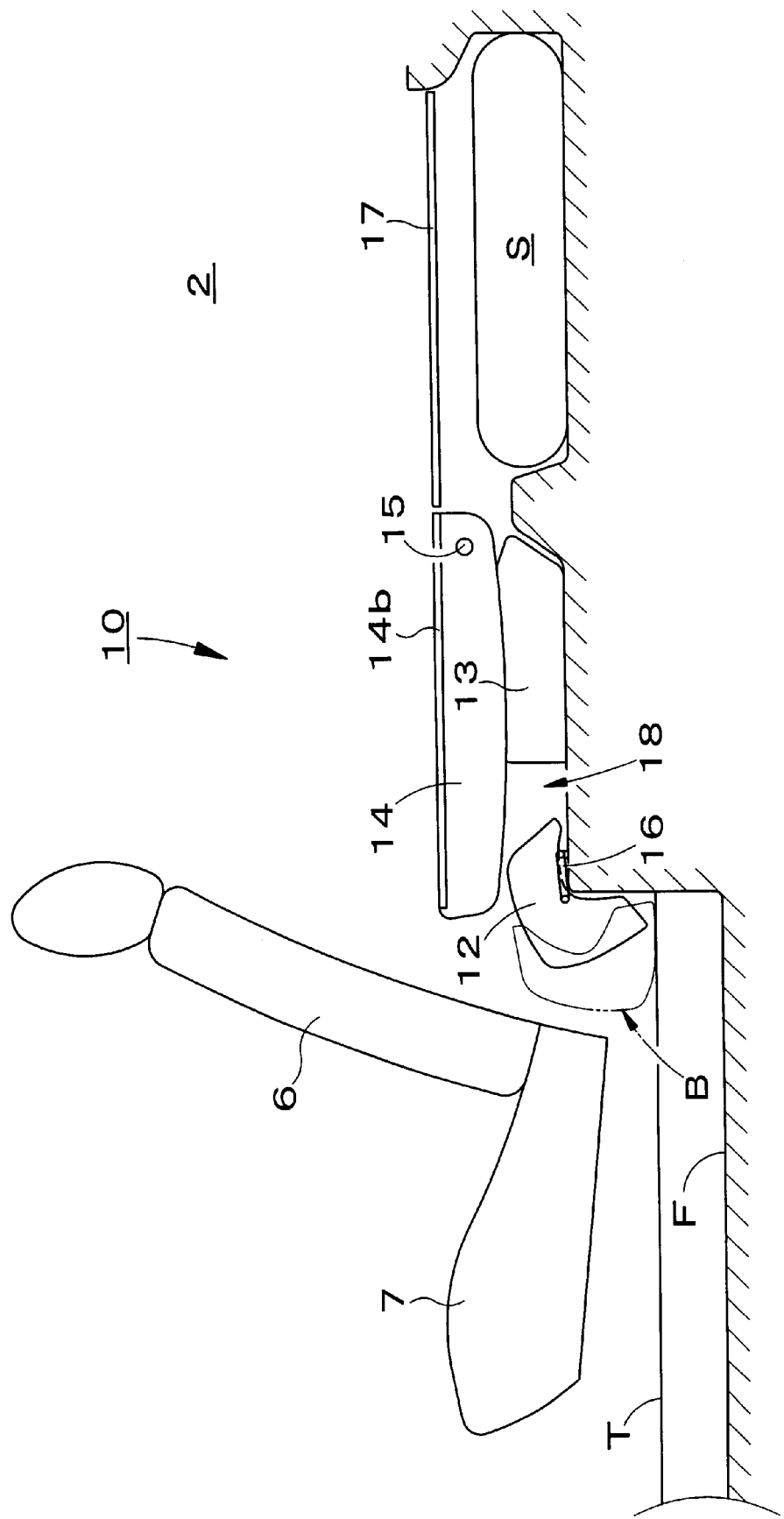
FIG. 2 is the schematic side elevation of the automobile seat in the first embodiment in a state where the seat back is set in the horizontal position.

Referring to FIGS. 1 and 2, a backseat 10, i.e., an automobile seat, in a first embodiment according to the present invention is installed in a station wagon as shown in FIG. 5. The backseat 10 has a seat cushion 11 divided by a lateral, vertical parting plane into a movable block 12 and a stationary block 13. The thickness of the movable block 12 is increased toward the front to support thighs of a passenger seated on the backseat 10 so that the passenger can sit comfortably on the backseat 10. The movable block 12 having such a thickness will obstruct turning forward a seat back 14 on pivots 15 to set the seat back 14 in the horizontal position. The movable block 12 is supported by a linkage 16 so that the movable block 12 can be moved between a first position indicated by continuous lines in FIG. 1 where the movable block 12 constitutes the seat cushion 11 together with the stationary block 13 and a second position in front of and on a level below that of the first position, indicated by imaginary lines in FIG. 1. When shifted to the second position, the lower end of the movable block 12 lies on a level above that of a longitudinal tunnel T rising from the floor F of a front compartment.

The stationary block 13 of the seat cushion 11, for supporting the buttocks of the passenger seated on the backseat 10 thereon is formed in a small thickness so that the seat back 14 may be inclined forward and set with its back surface 14b set horizontally as shown in FIG. 2 without being obstructed by the stationary block 13. When turning forward and setting in the horizontal position the seat back 14, first, the movable block 12 of the seat cushion 11 is shifted to the second position. Subsequently, a head rest 14a is removed from the seat back 14 and the seat back 14 is inclined forward. Since the forward turning of the seat back 14 is not obstructed by the movable block 12 of the seat cushion 11, the seat back 14 can be set in the horizontal position such that the back surface 14b of the seat back 14 is horizontal and flush with the surface of the floor board 17 of a luggage compartment 2. In this state, sufficient spaces are kept between the movable block 12 of the seat cushion 11 shifted to the second position and the seat back 6 of the front seat disposed in front of the backseat 10 and between the movable block 12 and the cushion seat 7 of the front seat. Therefore, the movable block 12 shifted to the second position does not obstruct the sliding and reclining operations of the front seat.

When the back part having the back surface 14b of the seat back 14 is formed of the same hardboard and the same covering material as those forming the floor board 17 of the luggage compartment 2.

A space 18 formed by shifting the movable block 12 of the seat cushion 11 to the second position as shown in FIG. 1 can be used as a storage space for storing small articles. The space 18 can be enlarged by designing the linkage 16 so as to be able to shift the movable block 12 of the seat cushion 11 to a third position indicated by the arrow B in FIG. 2.

Second Embodiment

Figure 3:
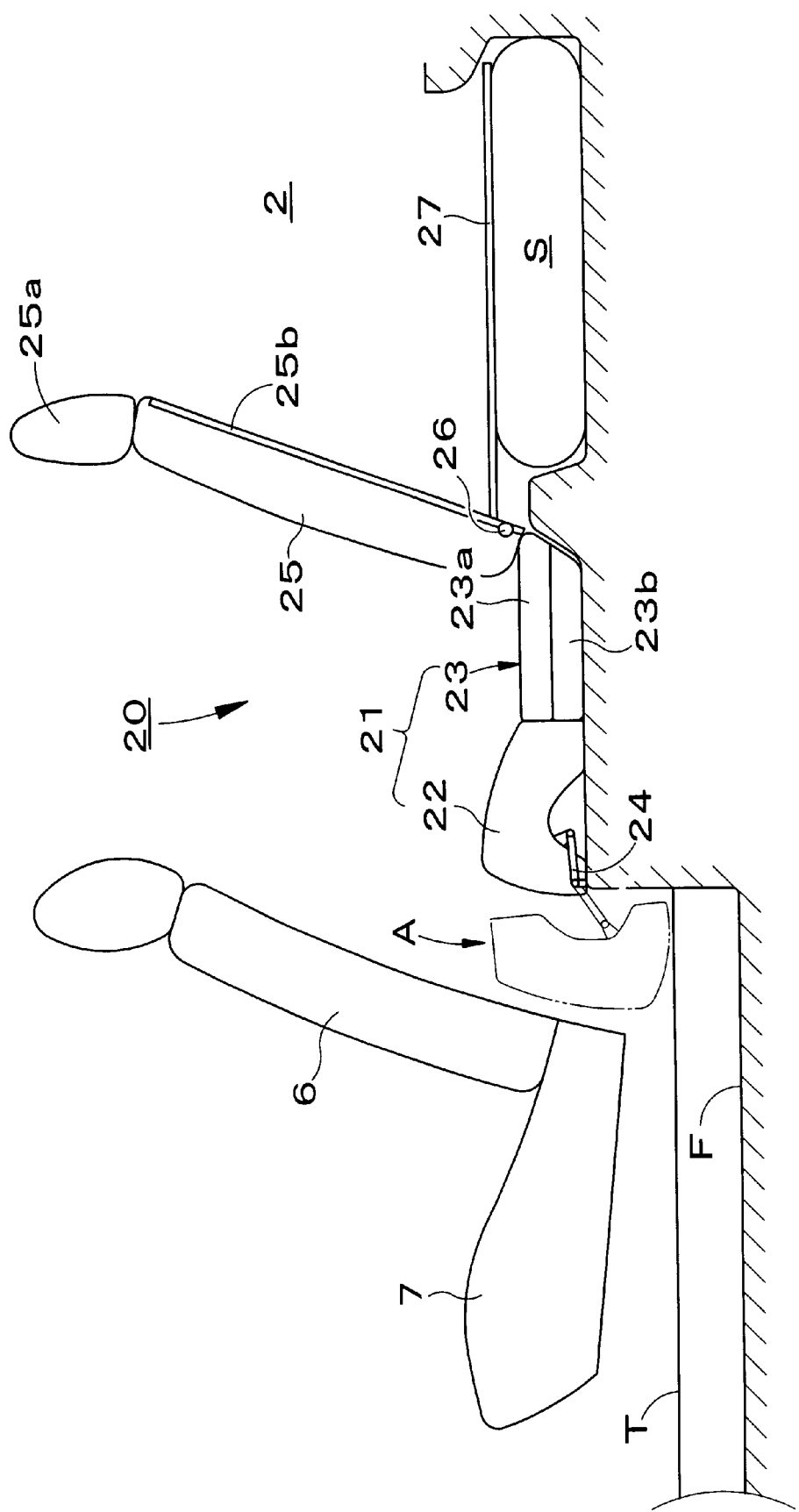
FIG. 3 is a schematic side elevation of an automobile seat in a second embodiment according to the present invention in a state where a seat back is in the upright position.

A backseat 20, i.e., an automobile seat, in a second embodiment according to the present invention shown in FIGS. 3 and 4 is an improvement on the automobile seat in the first embodiment installed in a station wagon. The backseat 20 has a seat cushion 21 having a length, i.e., a lateral dimension perpendicular to the sheet, corresponding to the inside width of the station wagon. The seat cushion 21 is divided into a movable block 22 and a stationary block 23 by a lateral, vertical parting plane perpendicular to the sheet. The thickness of the movable block 22 is increased toward the front to support the thighs of the passenger seated on the backseat 20 so that the passenger is able to sit comfortably on the backseat 20. The movable block 22 having such a thickness will obstruct turning forward a seat back 25 on pivots 26 to set the seat back 25 in the horizontal position. The movable block 22 is supported by a linkage 24 so that the movable block 22 can be moved between a first position indicated by thick continuous lines in FIG. 3 where the movable block 12 constitutes the seat cushion 21 together with the stationary block 23 and a second position in front of and on a level below that of the first position, indicated by imaginary lines in FIG. 3. When shifted to the second position, the lower end of the movable block 22 lies on a level above that of the longitudinal tunnel T rising from a part in a front compartment of the floor F.

The stationary block 23 of the seat cushion 21, for supporting the buttocks of the passenger seated on the backseat 20 thereon is divided into an upper part 23a and a lower part 23b of the same thickness. The upper part 23a and the lower part 23b are connected by a hinge mechanism so that the upper part 23a is able to turn on the hinge mechanism relative to the lower part 23b after shifting the front block 22 to the second position as shown in FIG. 4. Thus the stationary block 23 does not obstruct turning forward the seat back 25 on the pivots 26 to set the seat back 25 in the horizontal position as shown in FIG. 4. When turning forward and setting in the horizontal position the seat back 25 of the backseat 20, first, the movable block 22 of the seat cushion 21 is shifted to the second position and the upper part 23a is inclined forward relative to the lower part 23b. Subsequently, a head rest 25a is removed from the seat back 25 and the seat back 25 is inclined forward. Since the forward turning of the seat back 25 is not obstructed by the movable block 22 of the seat cushion 21, the seat back 25 can be set in the horizontal position such that the back surface 25b of the seat back 25 is horizontal and flush with the surface of the floor board 27 of a luggage compartment 2. Since the stationary block 23 of the seat cushion 21 is divided into the upper part 23a and the lower part 23b of the same thickness and can be arranged longitudinally as shown in FIG. 4, the thickness of the stationary block 23 can be reduced to half and, consequently, the back surface 25b of the seat back 25 can be extended in a horizontal plane close to the floor F and the floor board 27 of the luggage compartment 2 can be extended on a low level so as to form a space for storing a spare tire S.

If the seat cushion 32 of the front seat disposed in front of the backseat 20 is formed in the same structure as that of the seat cushion 21 of the backseat 20, the seat back 33 of the front seat can be inclined forward and set in the horizontal position as indicated by continuous lines in FIG. 4. Thus a luggage compartment floor having a spacious surface including the surface of the floor board 27 of the luggage compartment 2, the back surface 25b of the seat back 25 of the backseat 20 and the back surface 34 of the seat back 33 of the front seat can be formed.

As apparent form the foregoing description, according to one aspect of the present invention, the automobile seat has the seat cushion divided into the movable block that will obstruct turning the seat back forward and setting the same in the horizontal position and the stationary block that will not obstruct turning the seat back forward and setting the same in the horizontal position, the movable block is shifted to the second position where the movable block may not obstruct turning the seat back forward and setting the same in the horizontal position when turning the seat back forward and setting the same in the horizontal position. Since only the movable block is shifted forward, the seat cushion of the automobile seat does not obstruct the sliding and reclining operations of the seat disposed in front of the automobile set. The space formed by shifting the movable block to the second position can be used for storing small articles.

According to another aspect of the present invention, the stationary block is divided into the upper and the lower part of the same thickness and, when turning the seat back forward and setting the same in the horizontal position, the movable block is shifted to the second position and the upper part of the stationary block is inclined forward so as to line in front of the back part. Consequently, the thickness of the part of the seat cushion underlying the seat back set in the horizontal position is reduced, so that the back surface of the seat back set in the horizontal position can be extended on the low level, and hence the surface of the floor board of the luggage compartment can be formed on the low level.

Although the invention has been described in its preferred embodiments, the present invention is not limited in its practical application to those specifically described herein and many changes and variations may be made therein without departing from the scope and spirit thereof.

What is claimed is:

1. An automobile seat comprising:
   a seat cushion; and
   a seat back capable of being inclined forward so that back surface thereof is flush with a surface of a floor board of a luggage compartment extending behind the seat cushion;
   wherein the seat cushion is divided into a stationary block and a movable block, the stationary block underlies the seat back when the seat back is inclined forward and set at a horizontal position, and the movable block can be moved between a first position where the movable block forms the seat cushion together with the stationary block and a second position in front of the first position apart from a front end of the stationary block so as to make a space which is surrounded by the seat back, the stationary block, the moveable block and the floor pan, and
   wherein, the upper end portion of the seat back overlays the moveable block.

2. The automobile seat according to claim 1 further comprising a support mechanism capable of supporting the movable block so as to be movable between the first and second position.

3. The automobile seat according to claim 1 wherein the stationary block is divided into upper and lower parts and, when turning the seat back forward and setting the same in the horizontal position, the movable block is shifted from the first position to the second position, and the upper part of the stationary block is shifted to the first position.

4. The automobile seat according to claim 1, further comprising a second seat disposed in front of the automobile seat and having a second seat back capable of being inclined forward such that a second back surface of the same is flush with the back surface of the seat back of the automobile seat.

5. The automobile seat according to claim 2 wherein the stationary block is divided into upper and lower parts and, when turning the seat back forward and setting the same in the horizontal position, the movable block is shifted from the first position to the second position, and the upper part of the stationary block is shifted to the first position.

6. The automobile seat according to claim 2, further comprising a second seat disposed in front of the automobile seat and having a second sheet back capable of being inclined forward such that a second back surface of the same is flush with the back surface of the seat back of the automobile seat.

7. The automobile seat according to claim 3, further comprising a second seat disposed in front of the automobile seat and having a second seat back capable of being inclined forward such that a second back surface of the same is flush with the back surface of the seat back of the automobile seat.

8. An automobile seat comprising:
   a seat cushion divided into a stationary block and a movable block;
   a seat back capable of being inclined forward so that back surface thereof is flush with a surface of a floor board of a luggage compartment extending behind the seat cushion; and
   a support mechanism capable of supporting the movable block so as to be movable between the first and second position;
   wherein the stationary block is divided into upper and lower parts and, when turning the seat back forward and setting the same in the horizontal position, the upper part of the stationary block is shifted to the first position, and the movable block can be moved between a first position where the movable block forms the seat cushion together with the stationary block and a second position in front of and on a level below that of the first position.

9. The automobile seat according to claim 8, further comprising a second seat disposed in front of the automobile seat and having a second seat back capable of being inclined forward such that a second back surface of the same is flush with the back surface of the seat back of the automobile seat.

10. An automobile seat comprising:

a seat cushion disposed on a floor of the automobile; and a seat back capable of being inclined forward so that a back surface thereof is flush with a surface of a floor board of a luggage compartment extending behind the seat cushion;

wherein the seat cushion is divided into a stationary block and a movable block, the movable block can be moved between a first position where the movable block forms the seat cushion together with the stationary block and a second position in front of the first position apart from a front end of the stationary block, the stationary block underlies the seat back when the seat back is inclined forward and set at a horizontal position, and the seat back, the stationary block and the movable block are configured to make a space for storing articles on the floor of the automobile when the seat back is set at a horizontal position and the movable block is moved in the second position thereof, said space being surrounded by the seat back, the stationery block, the moveable block and the floor pan, and wherein the upper end portion of the seat back overlaps the moveable block.

11. The automobile seat according to claim 10, further comprising a support mechanism connected to the floor of the automobile for supporting the movable block so as to be movable between the first position and the second position.

12. The automobile seat according to claim 10, further comprising a second seat disposed in front of the automobile seat and having a second seat back capable of being inclined forward such that a second back surface of the same is flush with the back surface of the seat back of the automobile seat.

13. An automobile seat comprising:

a seat cushion disposed on a floor of the automobile and is divided into a stationary block and a movable block; and a seat back capable of being inclined forward so that back surface thereof is flush with a surface of a floor board of a luggage compartment extending behind the seat cushion;

wherein the movable block can be moved between a first position where the movable block forms the seat cushion together with the stationary block and a second position in front of the first position apart from a front end of the stationary block, and the stationary block is divided into upper and lower parts from a front edge thereof to a rear edge thereof to reduce a vertical thickness of the stationary block when the upper part is moved to the first position, and when turning the seat back forward and setting the same in the horizontal position, the movable block is moved to the second position, and the upper part of the stationary block is moved to the first position.

14. The automobile seat according to claim 13, further comprising a support mechanism connected to the floor for supporting the movable block so as to be movable between the first position and the second position.

15. The automobile seat according to claim 13, further comprising a second seat disposed in front of the automobile seat and having a second seat back capable of being inclined forward such that a second back surface of the same is flush with the back surface of the seat back of the automobile seat.

* * * * *